(12) United States Patent
Okumura et al.

(10) Patent No.: US 10,174,996 B2
(45) Date of Patent: Jan. 8, 2019

(54) METHOD OF DRYING HONEYCOMB FORMED BODY

(75) Inventors: Kensuke Okumura, Chiryu (JP); Shuichi Takagi, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 1689 days.

(21) Appl. No.: 13/033,966

(22) Filed: Feb. 24, 2011

(65) Prior Publication Data

US 2011/0227256 A1    Sep. 22, 2011

(30) Foreign Application Priority Data

Mar. 17, 2010   (JP) ................. 2010-060809

(51) Int. Cl.
| F26B 3/34 | (2006.01) |
| F26B 3/347 | (2006.01) |
| F26B 15/16 | (2006.01) |
| C04B 35/195 | (2006.01) |
| C04B 35/626 | (2006.01) |
| C04B 35/636 | (2006.01) |
| B28B 11/24 | (2006.01) |
| C04B 38/00 | (2006.01) |
| C04B 111/00 | (2006.01) |

(52) U.S. Cl.
CPC ............ *F26B 3/347* (2013.01); *B28B 11/241* (2013.01); *B28B 11/243* (2013.01); *C04B 35/195* (2013.01); *C04B 35/6263* (2013.01); *C04B 35/6365* (2013.01); *C04B 38/0006* (2013.01); *F26B 3/343* (2013.01); *F26B 15/16* (2013.01); *C04B 2111/00793* (2013.01); *C04B 2235/606* (2013.01); *F26B 2210/02* (2013.01)

(58) Field of Classification Search
CPC .......... F26B 3/347; F26B 7/002; B28B 11/242
USPC ............. 34/250, 254–259; 264/628, 630
See application file for complete search history.

(56) References Cited

U.S. PATENT DOCUMENTS

| 4,221,950 | A | * | 9/1980 | Lamberts et al. ............ 219/765 |
| 4,439,929 | A |   | 4/1984 | Kitagawa et al. |
| 4,837,943 | A | * | 6/1989 | Mizutani ........................ 34/250 |
| 4,974,503 | A | * | 12/1990 | Koch .............................. 99/451 |
| 6,725,567 | B2 | * | 4/2004 | Yano et al. ..................... 34/419 |
| 6,914,226 | B2 | * | 7/2005 | Ottaway ....................... 219/775 |
| 2003/0159619 | A1 |   | 8/2003 | Noguchi et al. |
| 2004/0206044 | A1 |   | 10/2004 | Kondo et al. |
| 2006/0042116 | A1 | * | 3/2006 | Terazawa et al. .............. 34/259 |
| 2006/0283039 | A1 |   | 12/2006 | Ishii et al. |

(Continued)

FOREIGN PATENT DOCUMENTS

| CN | 1846109 A | 10/2006 |
| EP | 0 700 882 A2 | 3/1996 |

(Continued)

OTHER PUBLICATIONS

Extended European Search Report (Application No. 11250247.1) dated Jan. 30, 2014.

(Continued)

*Primary Examiner* — Jason Lau
(74) *Attorney, Agent, or Firm* — Burr & Brown, PLLC

(57) ABSTRACT

A method of drying a ceramic formed body comprising the step of performing dielectric drying on an unfired honeycomb formed body formed with a ceramic material as a main raw material under a condition that a power density is 5 to 20 [kW/kg (water)].

7 Claims, 4 Drawing Sheets

(56) References Cited

U.S. PATENT DOCUMENTS

| | | | |
|---|---|---|---|
| 2007/0006480 A1* | 1/2007 | Ishii et al. | 34/265 |
| 2007/0241484 A1* | 10/2007 | Morimoto | 264/630 |
| 2009/0200712 A1 | 8/2009 | Hayashi et al. | |
| 2009/0235552 A1* | 9/2009 | Takagi et al. | 34/437 |
| 2009/0283517 A1* | 11/2009 | Mackay et al. | 219/700 |
| 2009/0294440 A1* | 12/2009 | Adrian | F26B 3/347 219/750 |
| 2009/0313846 A1* | 12/2009 | Horiba et al. | 34/259 |
| 2009/0320315 A1* | 12/2009 | Horiba et al. | 34/265 |
| 2010/0078859 A1* | 4/2010 | Takagi et al. | 264/432 |
| 2010/0236088 A1* | 9/2010 | Paice | 34/255 |

FOREIGN PATENT DOCUMENTS

| | | |
|---|---|---|
| JP | 60-037382 B2 | 8/1985 |
| JP | 63-034405 B2 | 7/1988 |
| JP | 63-166745 A1 | 7/1988 |
| JP | 2002-047069 A1 | 2/2002 |
| JP | 2003-181233 A1 | 7/2003 |
| JP | 2009-226633 A1 | 10/2009 |
| WO | WO 2009022919 A1 * | 2/2009 |

OTHER PUBLICATIONS

Japanese Office Action dated Jun. 25, 2013.
Chinese Office Action and Search Report (Application No. 201110070486.2) dated Dec. 1, 2014.
European Office Action, European Application No. 11250247.1, dated Jan. 4, 2017 (4 pages).
European Office Action (Application No. 11250247.1) dated Aug. 23, 2017.

\* cited by examiner

METHOD OF DRYING HONEYCOMB FORMED BODY

BACKGROUND OF THE INVENTION

Field of the Invention

The present invention relates to a method of drying honeycomb formed bodies. More specifically, the present invention relates to a method of drying honeycomb formed bodies with which they cannot easily be affected by an atmosphere in a dry space and can be dried without occurrence of deformation and cracks of outer peripheries thereof even when partition walls thereof are thin.

Description of Related Art

A honeycomb structure made of ceramics has been widely used for catalyst carriers, various filters, etc. Recently, the honeycomb structure has particularly attracted the attention as a diesel particulate filter (DPF) for capturing particulate matters discharged from a diesel engine.

Such honeycomb structure can generally be obtained by kneading a raw material composition obtained through addition of an auxiliary forming agent and various addition agents to a ceramic material and dispersion media such as water to form a kneaded clay, then extruding the kneaded clay into a honeycomb-shaped formed body (honeycomb formed body), drying this honeycomb formed body, and then firing the honeycomb formed body.

As means for drying honeycomb formed bodies, there have been known a natural drying method in which the honeycomb formed bodies are simply left under a room temperature condition, a hot-air drying method in which the honeycomb formed bodies are dried by a hot air generated with a gas burner etc., a dielectric drying method in which high-frequency energy is utilized, a microwave drying method in which microwaves are utilized, etc.

Among them, dielectric drying is performed by causing a current to flow between opposing electrode plates that are provided at an upper side of an opening top end surface and at a lower side of an opening bottom end surface of the honeycomb formed body, and by making water molecules in the honeycomb formed body in motion with high-frequency energy to generate frictional heat.

In the dielectric drying, densities of electric lines of force that pass through the honeycomb formed body easily become non-uniform, thereby partial drying delay occurs in the honeycomb formed body, and as a result of it, problems, such as variation in size and cracks, may occur in the obtained honeycomb structure. Consequently, there have been developed, for example, a method of employing a drying tray comprised of a perforated plate with high conductivity as shown in Patent Document 1, and further, for example, a method of placing a top plate with high conductivity on the opening top end surface of the honeycomb formed body as shown in Patent Document 2, and thereby it becomes possible to decrease partial diameter differences caused in the honeycomb structure and to reduce occurrence of the cracks by uniformizing the densities of the electric lines of force.

[Patent Document 1] JP-B-60-37382
[Patent Document 2] JP-A-63-166745

SUMMARY OF THE INVENTION

Problems to be Solved by the Invention

However, in recent years, a honeycomb structure with more exact shape accuracy has been required, and thus accuracy of a cross-sectional shape of the honeycomb structure, which has not been able to be achieved with the method of placing the top plate with high conductivity, etc., has become a problem. Further, although partition walls for partitioning a cell have become thinner along with the progress of the material technology, the thinner the partition walls of the honeycomb formed body become, the more easily deformation etc. thereof occur due to an effect of an atmosphere in a dry space, thus requiring a method of drying the honeycomb formed body in which the effect of the atmosphere is suppressed to the minimum.

With the dielectric drying method, when drying proceeds and water in the honeycomb formed body decreases, impedance increases and a voltage rises therewith, which may cause discharge and a breakdown between the electrode plates and in a high frequency circuit, resulting in facility failure. Hence, there is a certain limit to a voltage (output) at the time of dielectric drying.

The present invention is made in view of such problems of the conventional technology, and an object of the present invention is to provide a method of drying a honeycomb formed body with which dielectric drying can be performed without an effect of an atmosphere in a dry space under a voltage not more than a certain voltage even if the honeycomb formed body to be dried has a thin wall, and with which a honeycomb structure without any deformation or cracks can be obtained as an end product.

Means to Solve the Problem

As a result of earnest investigations in view of the above-described object, the present inventors have found out that a honeycomb structure with good quality can be manufactured with a good yield by performing dielectric drying while maintaining the intensity of high-frequency energy applied to a honeycomb formed body, which is a body to be dried, to be constant. In other words, according to the present invention, the following methods of drying honeycomb formed bodies are provided.

[1] A method of drying an unfired honeycomb formed body that is comprised of a raw material composition containing a ceramic material, a dispersion medium, an auxiliary forming agent, and an addition agent, and that has a plurality of cells partitioned by partition walls, the cells serving as fluid through channels, the method comprising the step of causing a current to flow, in a dry space, between opposing electrode plates that are provided at an upper side of an opening top end surface and at a lower side of an opening bottom end surface of the honeycomb formed body, to perform dielectric drying while maintaining a power density with respect to the honeycomb formed body to be in a range of 5 to 20 [kW/kg (water)].

[2] The method of drying the honeycomb formed body according to the above [1], wherein the method maintains the power density in the dry space to be in the range of 5 to 20 [kW/kg (water)] by controlling a filling factor of the honeycomb formed body in the dry space.

[3] The method of drying the honeycomb formed body according to the above [1] or [2], wherein the method maintains the power density in the dry space to be in the range of 5 to 20 [kW/kg (water)] by suppressing an area of the opposing electrode plates to be a minimum size effective for drying.

[4] The method of drying the honeycomb formed body according to any of the above [1] to [3], wherein a water content factor of the honeycomb formed body before dielectric drying is 20 to 25% by mass.

[5] The method of drying the honeycomb formed body according to any of the above [1] to [4], wherein the dielectric drying is performed until a water content factor of the honeycomb formed body after the dielectric drying becomes 10 to 40% with respect to the water content factor before the dielectric drying.

[6] The method of drying the honeycomb formed body according to any of the above [1] to [5], further comprising the step of performing microwave drying and/or hot-air drying after performing the dielectric drying.

[7] The method of drying the honeycomb formed body according to any of the above [1] to [6], wherein a binder having thermal gelation property and/or thermosetting property is included in the raw material composition as the auxiliary forming agent.

[8] The method of drying the honeycomb formed body according to the above [7], wherein a content of the binder in the raw material composition is 1 to 10% by mass.

[9] The method of drying the honeycomb formed body according to any of the above [1] to [8], wherein the method performs the dielectric drying while maintaining a wet-bulb temperature in the dry space to be not less than 60° C. and less than 100° C.

[10] The method of drying the honeycomb formed body according to any of the above [1] to [9], wherein opening ratios of the plurality of cells of the honeycomb formed body are 70 to 90%, and thicknesses of the partition walls are 0.05 to 0.2 mm.

Advantageous Effect of the Invention

According to a method of drying a honeycomb formed body of the present invention, deterioration of a cross-sectional shape, partially caused diameter differences, dents in an outer periphery, occurrence of cracks, etc. of the honeycomb formed body are reduced, and it is possible to perform drying with good dimensional accuracy even though the honeycomb formed body has thin partition walls.

DETAILED DESCRITPION OF THE INVENTION

Hereinafter, embodiments of the present invention will be described with reference to drawings. The present invention is not limited to the following embodiments, but they can be changed, modified, and improved unless departing from the scope of the invention.

Figure 1:
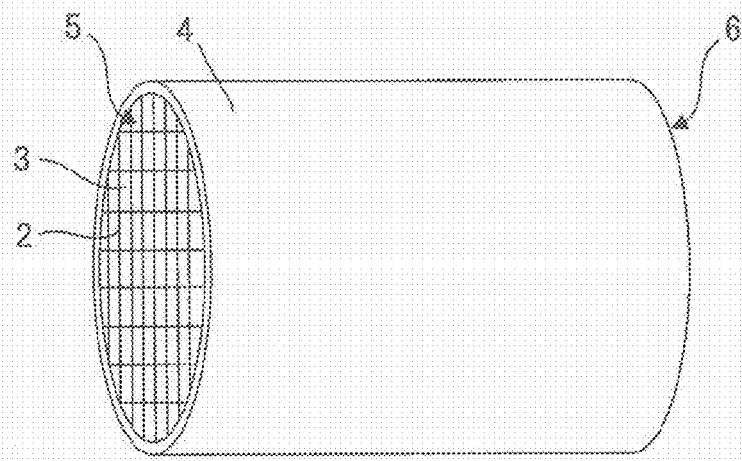
FIG. 1 is a perspective view showing one embodiment of a honeycomb formed body to be dried in a method of drying the honeycomb formed body of the present invention.

First will be described a honeycomb formed body, which is a body to be dried in a method of drying the honeycomb formed body of the present invention. FIG. 1 is a perspective view showing one embodiment of a honeycomb formed body to be dried in the method of drying the honeycomb formed body of the present invention.

A honeycomb formed body 1 shown in FIG. 1 is a honeycomb-shaped formed body having a plurality of cells 3 partitioned by partition walls 2, the cells serving as fluid through channels, in which an outer wall 4 is formed surrounding the plurality of cells 3, and an outline shape of the body is a cylinder. In addition, FIG. 2 is a perspective view showing another embodiment of a honeycomb formed body to be dried in the method of drying the honeycomb formed body of the present invention.

Figure 2:
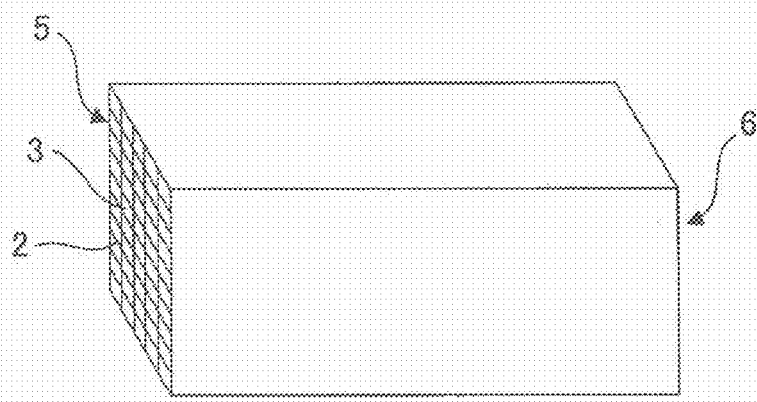
FIG. 2 is a perspective view showing another embodiment of a honeycomb formed body to be dried in the method of drying the honeycomb formed body of the present invention.

A honeycomb formed body 101 shown in FIG. 2 is a honeycomb-shaped formed body having the plurality of cells 3 partitioned by the partition walls 2, the cells serving as the fluid through channels, and an outline shape of the body is a square pole. The bodies to be dried to which the drying method of the present invention is applied are not limited to the embodiments shown in FIGS. 1 and 2, but as the cross-sectional shape of the honeycomb formed body perpendicular to an axial direction of the cells 3 (through channel direction), an arbitrary shape, such as a polygon, an oval, including a circle and a quadrangle can be selected.

As a manufacturing method of a honeycomb structure obtained by firing a honeycomb formed body after drying it, there are a method of manufacturing a honeycomb structure whose partition walls and an outer wall surrounding them are integrally formed, and a method of manufacturing a honeycomb structure having an outer wall by processing an outer periphery of partition walls after forming them, and then by newly coating a surface of the processed outer periphery with a cement coat layer whose aggregate is formed of a ceramic material. The honeycomb formed body 1 shown in FIG. 1 is one embodiment of the honeycomb formed body, which is an intermediate body in the former manufacturing method, and the honeycomb formed body 101 shown in FIG. 2 is one embodiment of the honeycomb formed body, which is an intermediate body in the latter manufacturing method. In a case of the latter manufacturing method, the outer wall 4 does not exist in the honeycomb formed body to be dried.

A honeycomb formed body to which the drying method of the present invention is applied is an unfired body obtained by, for example, extrusion-molding after kneading a raw material composition made by adding water as a dispersion medium, an auxiliary forming agent, and an addition agent to a ceramic material to form a kneaded clay. The unfired body means the body in a state where particles of the used ceramic material exist maintaining a form of particle at the time of forming, and where the ceramic material has not been sintered.

As the ceramic material, for example, there can be included oxide-based ceramics, such as alumina, mullite, zirconia, and cordierite, or non-oxide-based ceramics, such as silicon carbide, silicon nitride, and aluminum nitride. It is to be noted that in cordierite also included is mixed powder of a plurality of ceramic materials that are made into cordierite by firing. In addition, a composite material of silicon carbide/metal silicon, and a composite material of silicon carbide/graphite, etc. can also be used.

Next will be described the method of drying the honeycomb formed body of the present invention taking as an example a case of drying the aforementioned honeycomb formed body 1. In the method of drying the honeycomb formed body of the present invention, dielectric drying is first performed under a predetermined condition, and then preferably, microwave drying and/or hot-air drying are/is performed. For example, it is preferable to use a continuous apparatus in which the honeycomb formed body 1 is sequentially continuously carried in and out of a dielectric drying apparatus, a microwave drying apparatus, and/or a hot-air drying apparatus.

Figure 3:
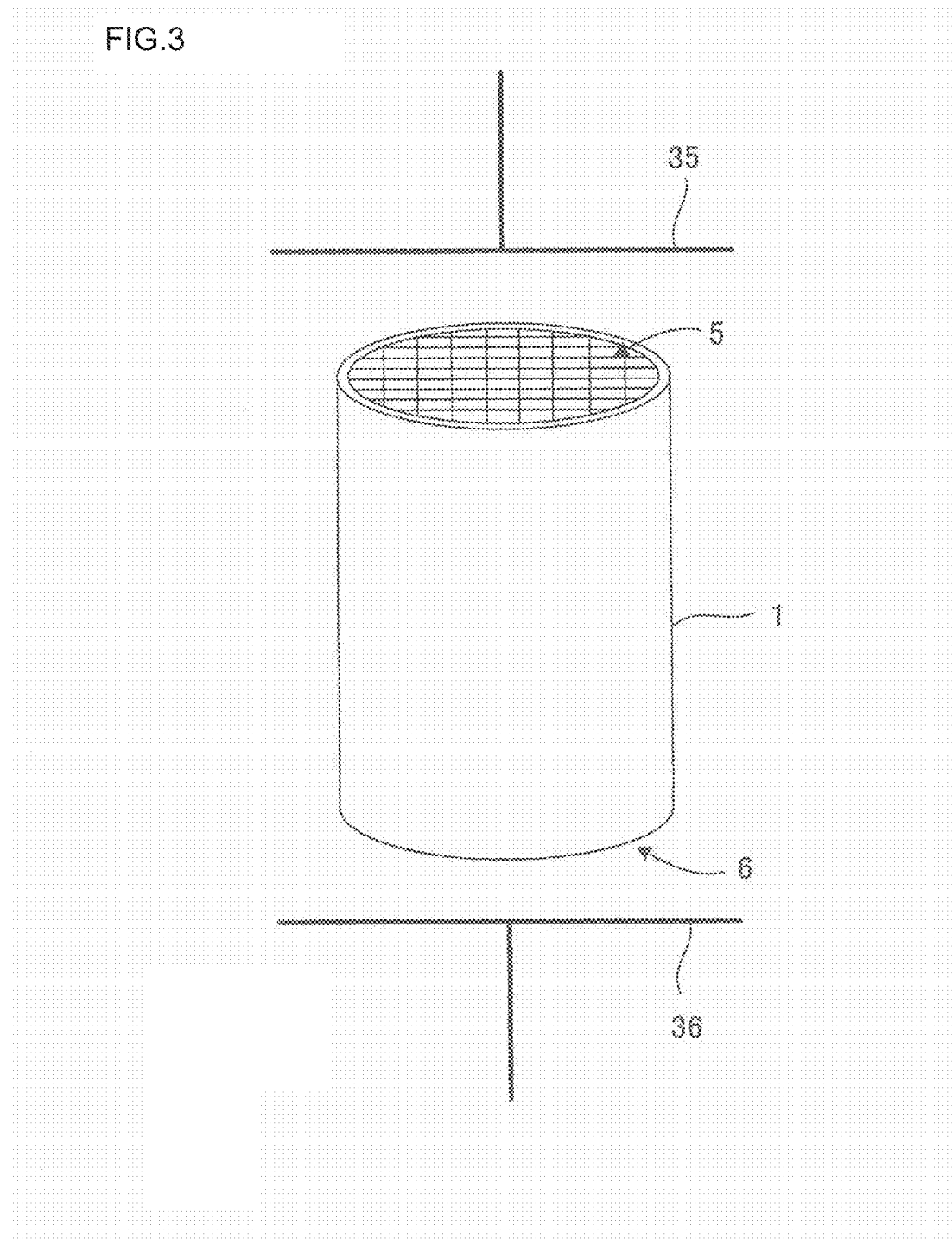
FIG. 3 is a plan view showing an appearance in which a honeycomb formed body to be subjected to dielectric drying is placed between opposing electrode plates.

FIG. 3 is a plan view showing an appearance in which a honeycomb formed body to be subjected to dielectric drying is placed between opposing electrode plates. In a dielectric drying step, as shown in FIG. 3, a high frequency current is applied between electrode plates 35 and 36 that are oppositely provided at an upper side of an opening top end surface 5 and at a lower side of an opening bottom end surface 6 of the honeycomb formed body 1, and the honeycomb formed body 1 is heated to be dried from an inside thereof due to dielectric loss in the inside thereof. In other words, in the dielectric drying apparatus, the honeycomb formed body 1 is heated to be dried in proportion to electric field distribution inside itself. Although an oscillation frequency of the applying high frequency current in this dielectric drying step is not particularly limited, it is preferable to be 2 to 100 MHz. In addition, an oscillation frequency of 6 to 50 MHz, which is the frequency utilized for industrial heating furnaces, is more preferable from a viewpoint of facility cost.

Figures 4, 5, 6A:
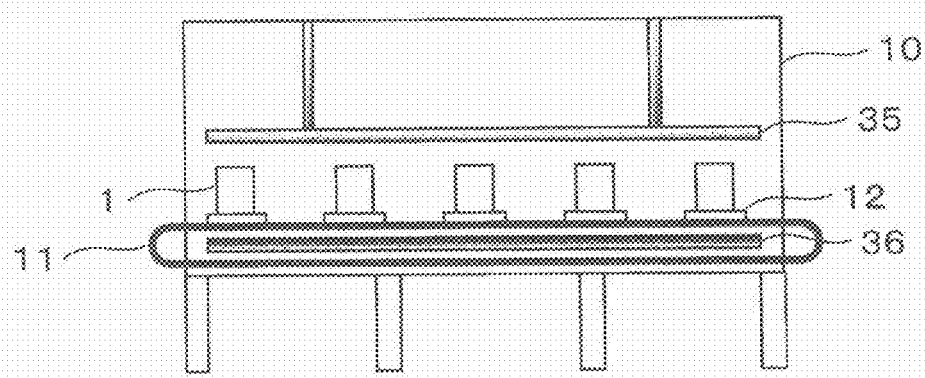
FIG. 4 is a schematic view showing one embodiment of a dielectric drying step in the method of drying the honeycomb formed body of the present invention.
FIG. 5 is a schematic view showing one embodiment of a conventional dielectric drying method of a honeycomb formed body.
FIG. 6A is a photograph showing one embodiment of a honeycomb formed body after dielectric drying.

FIG. 4 is a schematic view showing one embodiment of a dielectric drying step in the method of drying the honeycomb formed body of the present invention. As shown in FIG. 4, in the method of drying the honeycomb formed body of the present invention, a continuous dielectric drying apparatus 10 is suitably used, and the extrusion-molded honeycomb formed body 1 is sequentially continuously carried in and out of by a conveyor 11 at a constant speed. At this time, it is preferable that each honeycomb formed body 1 is conveyed inside the dielectric drying apparatus 10 in a state of being placed on a punching plate (perforated plate) 12. Since the dielectric drying apparatus 10 has exhausting means (not shown) that discharges water vapor evaporated from the honeycomb formed body 1 to an outside of a dry space, a humidity atmosphere in the dry space can always be kept approximately constant.

In the method of drying the honeycomb formed body of the present invention, intensity of high-frequency energy applied to the honeycomb formed body in the dielectric drying is indicated with an index of a power density. The inventors defines that the power density is equal to an energy P [kW] effective for drying/a water amount in the body to be dried W [kg], and they have found out that the comprehensively best dried result can be obtained when a value of the power density is 5 to 20 [kW/kg (water)]. Here, the "energy P effective for drying" means an electric power supplied to dry all undried honeycomb formed bodies in the dry space to a predetermined level under a predetermined condition. It is to be noted that this supplied power is calculated by an equation $P = a*b*(1-d)*(100-T) + 4.18*b*d*(100-T) + b*c*e$ where specific heat at the time of absolute dry of the honeycomb formed body is a [kJ/kg-° C], a processing amount of the honeycomb formed body is b [kg/h], a temperature of the honeycomb formed body is T [° C], evaporation heat of water is c [kJ/kg], a water content factor of the honeycomb formed body is d [%], and a dispersion rate of the honeycomb formed body is e [%].

In addition, the "water amount in the body to be dried W" means a total water amount contained in all the undried honeycomb formed bodies in the dry space, and it is calculated by $W = b*e*t$ where a drying time period per one work piece is t (h). In other words, in order to achieve high dimensional accuracy and yield, it is preferable that an electric power of 5 to 20 [kW] per contained unit water amount (1 kg) is applied with respect to the undried honeycomb formed body, which is the body to be dried. Note that it is not preferable that the power density is less than 5 [kW/kg (water)] since the dimensional accuracy of the dried honeycomb formed body is reduced. Meanwhile, it is not preferable that the power density exceeds 20 [kW/kg (water)] since discharge occurs in the dry space with a high probability, leading to cause facility failure. In addition, since the output does not increase due to a structure of the facility when water in the dry space decreases, it is virtually difficult to dry the honeycomb formed body under a condition that the power density exceeds 20 [kW/kg (water)].

FIG. 5 is a schematic view showing one embodiment of a conventional dielectric drying method of a honeycomb formed body. In a conventional method of drying the honeycomb formed body, it has been a common sense of those skilled in the art that a filling factor of the honeycomb formed body 1 in the dry space is made to be high in order to obtain a maximum drying efficiency. The inventors have found out that a total water amount in the dry space is suppressed low by daringly controlling the filling factor to be low, the power density is maintained to be in a range of 5 to 20 [kW/kg (water)], and that as a result of it, it is possible to improve a drying speed and quality. Although the drying efficiency seemingly decreases by lowering the filling factor, it becomes possible to reduce a drying time period per one honeycomb formed body, i.e., a stay time period in the dry space or a transit time period thereof in the drying apparatus of each honeycomb formed body, because of the increase of the power density, and further, it becomes possible to comprehensively improve the yield because of the improvement of the dimensional accuracy and a occurrence rate of the failure.

As a method of maintaining the power density to be in the range of 5 to 20 [kW/kg (water)], there is a method of suppressing the area of the electrode plates oppositely arranged at the upper and lower sides of the honeycomb formed body to a minimum size effective for drying other than the aforementioned method of controlling the filling factor in the dry space. It is possible to change an output per unit area of the electrode plates by changing the area of the electrode plates even though the same electric power is supplied, and generally, under a constant supplied power, the area of the electrode plates and the output per unit area thereof have an inverse relationship to each other. For example, when the area of the electrode plates is reduced to half while keeping the supplied power constant, the power density becomes double. Hence, it becomes possible to increase the power density by changing the area of the electrode plates from a conventional size into the minimum size enough to cover the honeycomb formed body placed in the dry space.

Since electromagnetic waves can easily be permeated deeply through the honeycomb formed body with the dielectric drying method, and thus the method is suitable for uniformly drying the honeycomb formed body, it is suitably utilized in a state where the water content factor of the body to be dried is high. Specifically, it is preferable that the honeycomb formed body to which the drying method of the present invention is applied has a water content factor of 20 to 25% by mass immediately after formed (immediately before the dielectric drying). Here, the "water content factor of the honeycomb formed body immediately after formed" means a percentage of a water mass (% by mass) in a mass of a whole raw material composition at the time of preparation of the raw material composition.

In the dielectric drying step, it is preferable to perform drying with respect to the honeycomb formed body immediately after formed until a ratio of water content factor of the honeycomb formed body after the dielectric drying becomes 10 to 40%. Here, the "ratio of water content factor of the honeycomb formed body after the dielectric drying" is calculated by multiplying by 100 a value obtained by dividing a water content factor of the honeycomb formed body immediately after the dielectric drying by the water content factor of the honeycomb formed body immediately after formed. It is to be noted that the "water content factor of the honeycomb formed body immediately after the dielectric drying" is defined as a value calculated as follows: a water content of the honeycomb formed body immediately after the dielectric drying is calculated from a difference between a mass of the honeycomb formed body immediately after the dielectric drying and a mass of the honeycomb formed body in an absolute dry state; and then this water content is divided by a mass of the whole honeycomb formed body immediately after the dielectric drying. In addition, the "water content factor of the honeycomb formed body immediately after formed" is defined as a value calculated as follows: a water content of the honeycomb formed body immediately after formed is calculated from a difference between amass of the honeycomb formed body immediately after formed and the mass of the honeycomb formed body in the absolute dry state; and then this water content is divided by a mass of the whole honeycomb formed body immediately after formed.

When the ratio of water content factor of the honeycomb formed body after the dielectric drying is lower than 10%, the water content factor of the honeycomb formed body, which is the body to be dried, becomes low, a voltage (output) is limited with the increase of impedance, and thus the honeycomb formed body enters a state unsuitable for the dielectric drying method. Hence, it is preferable to provide a step of performing microwave drying and/or hot-air drying following the dielectric drying step, and to thereby perform the remaining drying step.

In the method of drying the honeycomb formed body of the present invention, it is preferable to use a binder having thermal gelation property and/or thermosetting property as an auxiliary forming agent contained in the raw material composition used as a material of the honeycomb formed body. When the raw material composition is made to contain the binder having thermal gelation property and/or thermosetting property, it becomes possible to increase the strength of the partition walls and an outer peripheral wall of the honeycomb formed body by raising temperatures of the partition walls and the outer peripheral wall of the honeycomb formed body to a temperature not less than a gelation temperature at the time of drying. Here, the thermal gelation property means a property that when a binder water solution is heated, it turns into a gel, and a viscosity thereof increases. In addition, here, the thermosetting property means a property that when a honeycomb formed body comprised of a raw material composition including the binder or the raw material composition is heated, strength thereof increases.

Specifically, as the binder having thermal gelation property and/or thermosetting property, there can be included, for example, methylcellulose, hydroxypropylmethylcellulose, carboxymethylcellulose, hydroxyethylcellulose, hydroxyethylmethylcellulose, etc. Among them, methylcellulose is most commonly used. The gelation temperatures of these binders are approximately 50 to 80° C. although they vary with the type thereof and, for example, that of methylcellulose is approximately 55° C. In addition, it is also possible to use a mixture of different types of gelation binders. Although it is also possible to use together a binder not having thermal gelation property and thermosetting property, it is preferable to use the binder having thermal gelation property and/or thermosetting property as a main component, and it is most preferable to use only the binder having thermal gelation property and/or thermosetting property.

As for the binder contained in the raw material composition used as the material of the honeycomb formed body dried by the drying method of the present invention, it is preferable that a total of 1 to 10% by mass thereof is added to the raw material composition. It is not preferable that a content of the binder is less than 1% by mass since formability and shape retaining property of the honeycomb formed body are reduced. In addition, it is not preferable that the content of the binder exceeds 10% by mass since overheating by binder combustion is large and chips (cracks) etc. occur on the partition walls and the outer peripheral wall of the honeycomb formed body when the dried honeycomb formed body is fired and degreased. As a more suitable content, it is preferable that a lower limit thereof is not less than 1.5% by mass and further not less than 2% by mass, and an upper limit thereof is not more that 8% by mass and further not more than 6% by mass.

In the method of drying the honeycomb formed body of the present invention, it is preferable to perform dielectric drying while maintaining a wet-bulb temperature in the dry space to be not less than 60° C. The aforementioned binder turns into a gel and/or hardens by performing the dielectric drying under an atmosphere not less than 60° C., thus enabling to improve the strength of the dried honeycomb formed body.

In the method of drying the honeycomb formed body of the present invention, a size of the honeycomb formed body is not particularly limited. However, the drying method of the present invention particularly remarkably exerts an effect when drying a honeycomb formed body easily affected by a drying atmosphere due to a thin wall thereof, and specifically, the method is the most effective when thicknesses of the partition walls 2 that partition the plurality of cells 3 are 0.05 to 0.2 mm, and opening ratios of the plurality of cells 3 are 70 to 90%. It is to be noted that the opening ratio of the cell is calculated by multiplying by 100 an opening area ratio, which is a percentage of an opening area of an end surface with respect to an area of a whole opening end surface.

EXAMPLES

Hereinafter, the present invention will be described in more detail based on examples, but it is not limited to these examples.

(Experiment 1) Under the following conditions, a drying experiment was performed with which an output of a dielectric drying apparatus was set to be constant, the number of honeycomb formed bodies in a dry space was changed to thereby change a power density, and an effect on an appearance of the dried honeycomb formed body was examined.

[Honeycomb formed body] A cordierite raw material obtained by mixing alumina, kaolin, and talc was used as a ceramic material, and an auxiliary forming agent containing 7 parts by mass of methylcellulose as an organic binder, an addition agent, and water as a dispersion medium were mixed and kneaded to obtain kneaded clay. The obtained clay was extrusion-molded, and such a honeycomb formed body was obtained that a diameter was 120 mm, a length (axial length) was 180 mm, an outline shape was a cylinder, and a shape of a cross section perpendicular to a central axis of a cell was a square. As for the obtained honeycomb formed body, a cell density was 400 cells/in$^2$ ("in" indicates an inch, which is 2.54 cm by SI unit system), an opening ratio of the end surface was 86%, a thickness of the partition wall was 0.08 mm, and a water content factor was 24%. It is to be noted that the honeycomb formed body of the similar conditions to the above was used even in any example and comparative example in the first experiment.

[Drying method] The obtained honeycomb formed body was placed in a batch-type dielectric drying apparatus, and dielectric drying was performed until the water content factor of the honeycomb formed body became 4% with 13 MHz frequency and 2 kW output using a timer for setting an oscillation time period. At this time, a wet-bulb temperature in the dry space was set to be 35° C., and the number of the honeycomb formed bodies, a power density, and a drying speed in the dry space in each example and comparative example were set as shown in Table 1, respectively. It is to be noted that the drying speed was calculated based on a drying time period (oscillation time period) previously calculated based on past data so that the water content factor of the honeycomb formed body might be not more than 4%. In addition, a conventionally well-known apparatus was used as the batch-type dielectric drying apparatus.

[Evaluation] Presence/absence of dents in the honeycomb formed body having dried under each condition was visually confirmed. Results are shown in Table 1 and FIGS. 6A to 6C. It is to be noted that a photograph in FIG. 6A shows an appearance of the honeycomb formed body after the dielectric drying in a first comparative example shown in Table 1, a photograph in FIG. 6B shows an appearance of the honeycomb formed body after the dielectric drying in a first example shown in Table 1, and that a photograph in FIG. 6C shows an appearance of the honeycomb formed body after the dielectric drying in a second example shown in Table 1.

Figure 6B:
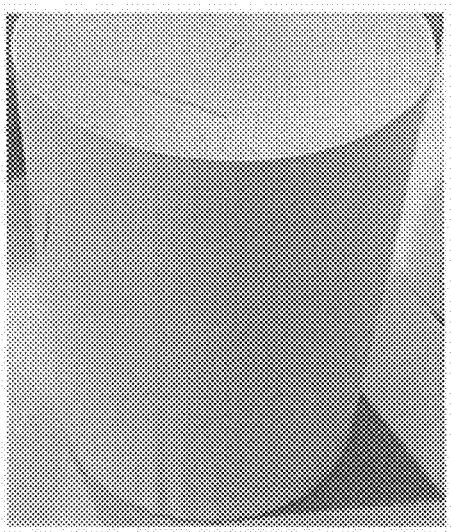
FIG. 6B is a photograph showing another embodiment of a honeycomb formed body after dielectric drying.
Figure 6C:
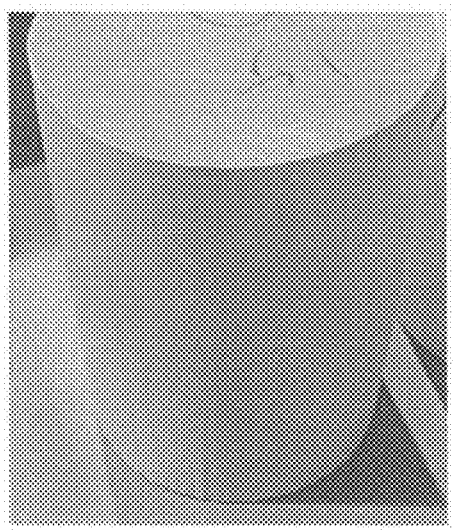
FIG. 6C is a photograph showing still another embodiment of a honeycomb formed body after dielectric drying.

[Results] As shown in Table 1 and FIG. 6A, although a remarkable dent on the outer wall was observed in the drying method of the first comparative example in which the power density is less than 5 [kW/kg (water)], as shown in Table 1 and FIGS. 6B and 6C, occurrence of remarkable dents was not observed in the drying methods of the first and second examples in which the power density is within a range of 5 to 20 [kW/kg (water)]. It is to be noted that although a slight dent was observed in the first example in which the power density is 6.2 [kW/kg (water)], it was within an allowable range in commercially producing honeycomb formed bodies.

TABLE 1

|  | Comparative Example 1 | Example 1 | Example 2 |
| --- | --- | --- | --- |
| The number of honeycomb formed bodies in dry space | five pieces | two pieces | one piece |
| Power density | 2.5[kW/kg (water)] | 6.2[kW/kg (water)] | 12.5[kW/kg (water)] |

TABLE 1-continued

|  | Comparative Example 1 | Example 1 | Example 2 |
| --- | --- | --- | --- |
| Drying speed | 0.6[kg (water)/h] | 1.1[kg (water)/h] | 1.4[kg (water)/h] |
| Dent | occurrence (remarkable) | occurrence (slight) | nonoccurrence |

(Experiment 2) Under the following conditions, a drying experiment was performed in which the output of the dielectric drying apparatus was set to be constant, the number of honeycomb formed bodies in the dry space was changed to thereby change the power density, and an effect on dimensional accuracy and shape accuracy of the dried honeycomb formed body was examined.

[Honeycomb formed body] A cordierite raw material obtained by mixing alumina, kaolin, and talc was used as a ceramic material, and an auxiliary forming agent containing 4 parts by mass of methylcellulose as an organic binder, an addition agent, and water as a dispersion medium were mixed and kneaded to obtain kneaded clay. The obtained kneaded clay was extrusion-molded, and such a honeycomb formed body was obtained that a diameter was 150 mm, a length (axial length) was 210 mm, an outline shape was a cylinder, and a shape of a cross section perpendicular to a central axis of a cell was a square. As for the obtained honeycomb formed body, a cell density was 400 cells/in$^2$, an opening ratio of an end surface was 86%, a thickness of the partition wall was 0.08 mm, and a water content factor was 24%. It is to be noted that the honeycomb formed body of the similar conditions to the above was used even in any example and comparative example in Experiment 2.

[Drying method] Using a continuous dielectric drying apparatus shown in FIG. 4, dielectric drying was performed with respect to the obtained honeycomb formed body until the water content factor of the honeycomb formed body became 2% with 13 MHz frequency and 150 kW output. At this time, a wet-bulb temperature in the dry space was set to be 35° C., and a supply speed of the honeycomb formed body was set to be 110 kg/h. In addition, a filling factor and the power density of the honeycomb formed body in the dry space in each example and comparative example were set as shown in Table 2, respectively. Here, 100% filling factor means a maximum filling factor in a conventional dielectric drying method of the honeycomb formed body, and also means a state where carriers on which the honeycomb formed body is placed are continuously supplied without a space therebetween, i.e., a state where a space between adjacent carriers is 0 mm. In addition, 50% filling factor means a half filling factor when defining the maximum filling factor in the conventional drying method as 100%, and specifically, means a state where a space for one carrier (200 mm) is kept between the adjacent carriers. When the filling factor in the dry space in this experiment is converted into the number of honeycomb formed bodies, 125 pieces of honeycomb formed bodies (25 sheets of carriers) are supplied in the third comparative example in which the filling factor is 100%, and 60 pieces of honeycomb formed bodies (12 sheets of carriers) are supplied in the second example in which the filling factor is 50%.

[Evaluation] As for the honeycomb formed body having dried under each condition, diameters at 20 different height positions were measured, respectively using an outer diameter shape automatic measurement apparatus disclosed in JP-B-63-34405. Here, a height of a honeycomb formed body means a distance to a predetermined position in an axial direction of the honeycomb formed body when an opening bottom end surface is defined as a starting point. At the time of measurement, diameters of 3000 points were measured, respectively by an optical gauge, with an area centroid of a cross section of the honeycomb formed body at each height position being a center. An average value of the diameters of 3000 points at each height position is defined as an average diameter at the each height position, particularly, a difference between an average diameter of an opening top end surface and an average diameter of an opening bottom end surface is calculated as a diameter difference between the top and the bottom of the honeycomb formed body, and the calculated difference is shown in Table 2 with an average diameter of each end surface.

Further, a maximum value and a minimum value were taken among the diameters of 3000 points measured at each height position, and a difference between the values was calculated as a maximum and minimum diameter difference at each height position. Among the maximum and minimum diameter differences at respective height positions, a maximum and minimum diameter difference at height 180 mm is defined as a top maximum and minimum diameter difference, and a maximum and minimum diameter difference at height 30 mm is defined as a bottom maximum and minimum diameter difference, and the results are shown in Table 2. It is to be noted that since in actual production, the top and bottom ends of the dried honeycomb formed body, in which shape accuracy is easily reduced, are cut off, and then a predetermined length of a portion with a good shape is cut out to be a product, shape accuracy at height 30 mm and 180 mm, i.e., smallness of the maximum and minimum diameter difference, becomes one guide when the honeycomb formed bodies are commercially produced.

[Results] As is apparent from Table 2, although in the drying method of Comparative Example 2 in which the power density was set to be less than 5 [kW/kg (water)] by making a filling factor in the dry space high similar to the conventional one, the top and bottom diameter difference is large, i.e., 0.5mm, in the drying method of Example 3 in which the power density was set within the range of 5 to 20 [kW/kg (water)] by reducing the filling factor in the dry space in half, the top and bottom diameter difference is not observed, a size difference between the top and the bottom of the honeycomb formed body is improved, and thus dimensional accuracy is improved as the whole honeycomb formed body. Note that it is preferable that a range of the top and bottom diameter difference is less than 0.5 mm since the difference causes failure such as cracks in a fired honeycomb structure in manufacturing the honeycomb structures.

In addition, although the bottom maximum and minimum diameter difference is large, i.e., 1.26 mm in the drying method of Comparative Example 2, both the top and bottom maximum and minimum diameter differences are suppressed to be low in the drying method of Example 3. Note that the maximum and minimum diameter difference of the cross section is used as an index indicating a deformation degree of the outer periphery in manufacturing the honeycomb structures, and that it is preferable that the maximum and minimum diameter difference of a portion used as a honeycomb structure of the dried honeycomb formed body falls within a range not more than 1.00 mm in order to manufacture a honeycomb structure with sufficient shape accuracy. According to this experiment, it turned out that the power density is maintained within a desired range by controlling the filling factor in the dry space, thereby the top and bottom diameter difference and the maximum and minimum diameter difference of the dried honeycomb formed body fall within allowable ranges, respectively, and that thus it becomes possible to manufacture a honeycomb structure with high dimensional accuracy and shape accuracy.

TABLE 2

|  | Comparative Example 2 | Example 3 |
| --- | --- | --- |
| Filling factor in dry space | 100 [%] | 50 [%] |
| Power density | 4.5 [kW/kg (water)] | 9.0 [kW/kg (water)] |
| Supply speed | 1100 [kg/h] | 1100 [kg/h] |
| Average diameter of opening top end surface | 150.5 [mm] | 150.0 [mm] |
| Average diameter of opening bottom end surface | 150.0 [mm] | 150.0 [mm] |
| Top and bottom diameter difference | 0.5 [mm] | 0.0 [mm] |
| Top maximum and minimum diameter difference | 0.67 [mm] | 0.70 [mm] |
| Bottom maximum and minimum diameter difference | 1.26 [mm] | 0.91 [mm] |

(Experiment 3) Under the following conditions, a dry experiment was performed in which the power density was changed by output control supposing area change of the electrode plates in the dielectric drying apparatus, and an effect on shape accuracy of a dried honeycomb formed body was examined. Generally, under a constant supplied power, the area of the electrode plates and the power density per unit area thereof have an inverse relationship to each other, and reducing the electrode areas means the same as increasing the power density per unit area. In order to perform the experiment simply, the experiment was performed by replacing the change of the electrode areas with output control.

[Honeycomb formed body] A cordierite raw material obtained by mixing alumina, kaolin, and talc was used as a ceramic material, and an auxiliary forming agent containing 7 parts by mass of methylcellulose as an organic binder, an addition agent, and water as a dispersion medium were mixed and kneaded to obtain kneaded clay. The obtained kneaded clay was extrusion-molded, and such a honeycomb formed body was obtained that a diameter was 135 mm, a length (axial length) was 210 mm, an outline shape was a cylinder, and a shape of a cross section perpendicular to a central axis of a cell was a square. As for the obtained honeycomb formed body, a cell density was 400 cells/in$^2$, an opening ratio of an end surface was 86%, a thickness of the partition wall was 0.08 mm, and a water content factor was 24%. It is to be noted that the honeycomb formed body of the similar conditions to the above was used even in any example and comparative example in Experiment 3.

[Drying method] The obtained honeycomb formed body was placed in the batch-type dielectric drying apparatus, and dielectric drying was performed until the water content factor of the honeycomb formed body became 2% with 13 MHz frequency using 1000 mm-by-1000 mm electrode plates. At this time, a wet-bulb temperature in the dry space was set to be 35° C., and a filling factor of the honeycomb formed body, an output, and a power density in the dry space in each example and comparative example were set as shown in Table 3, respectively.

[Evaluation] As for the honeycomb formed body having dried under each condition, diameters at 20 different height positions were measured, respectively using the outer diameter shape automatic measurement apparatus disclosed in Patent Document, JP-B-63-34405. Here, the "height" of the honeycomb formed body means a distance to a predetermined position in an axial direction of the honeycomb formed body when an opening bottom end surface is defined as a starting point. At the time of measurement, diameters of 3000 points were measured, respectively by the optical gauge, with an area centroid of a cross section of the honeycomb formed body at each height position being a center, a maximum value and a minimum value were taken from the diameters, and a difference therebetween was calculated as a maximum and minimum diameter difference at each height position. Among the maximum and minimum diameter differences at respective height positions, a maximum and minimum diameter difference at height 180 mm is defined as a "top" maximum and minimum diameter difference, and a maximum and minimum diameter difference at height 30 mm is defined as a "bottom" maximum and minimum diameter difference. The results are shown in Table 3.

[Results] As is apparent from Table 3, although in the drying methods of Comparative Examples 3 and 4 in which the power density was set to be less than 5 [kW/kg (water)], the bottom maximum and minimum diameter differences indicate 1.88 mm and 1.46 mm, respectively, i.e., they exceed 1.00 mm, which is an allowable maximum value, in the drying method of the fourth example in which the power density was set within the range of 5 to 20 [kW/kg (water)], both the top and bottom maximum and minimum diameter differences are suppressed to be low, i.e., not more than 1.00 mm. Hence, according to this experiment, it turned out that the maximum and minimum diameter difference can be not more than 1.0 mm in the whole dried honeycomb formed body by controlling the electrode plate area to make the power density high, and that thus it becomes possible to manufacture a honeycomb structure with high shape accuracy.

TABLE 3

| | Comparative Example 3 | Comparative Example 4 | Example 4 |
|---|---|---|---|
| Filling factor in dry space | 20 [%] | 10 [%] | 10 [%] |
| Output | 2 [kW] | 2 [kW] | 4 [kW] |
| Power density | 1.9 [kW/kg (water)] | 3.8 [kW/kg (water)] | 7.6 [kW/kg (water)] |
| Top maximum and minimum diameter difference | 0.72 [mm] | 0.56 [mm] | 0.46 [mm] |
| Bottom maximum and minimum diameter difference | 1.88 [mm] | 1.46 [mm] | 0.95 [mm] |

(Experiment 4) Under the following conditions, a drying experiment was performed in which the output of the dielectric drying apparatus was set to be constant, the number of honeycomb formed bodies in the dry space was changed to thereby change the power density, and an effect on dimensional accuracy of the dried honeycomb formed body was examined.

[Honeycomb formed body] A cordierite raw material obtained by mixing alumina, kaolin, and talc was used as a ceramic material, and an auxiliary forming agent containing 7 parts by mass of methylcellulose as an organic binder, an addition agent, and water as a dispersion medium were mixed and kneaded to obtain kneaded clay. The obtained kneaded clay was extrusion-molded, and such a honeycomb formed body was obtained that a diameter was 113 mm, a length (axial length) was 210 mm, an outline shape was a cylinder, and a shape of a cross section perpendicular to a central axis of a cell was a square. As for the obtained honeycomb formed body, a cell density was 900 cells/in$^2$, an opening ratio of an end surface was 86%, a thickness of the partition wall was 0.06 mm, and a water content factor was 23%. It is to be noted that the honeycomb formed body of the similar conditions to the above was used even in any example and comparative example in Experiment 4.

[Drying method] Dielectric drying was performed with respect to the obtained honeycomb formed body until the water content factor thereof became 1% with 40 MHz frequency and 100 kW output using the continuous dielectric drying apparatus shown in FIG. 4. At this time, a wet-bulb temperature in the dry space was set to be 60° C. In addition, a filling factor, a power density, and a supply speed of the honeycomb formed body in the dry space in each example and comparative example were set as shown in Table 4, respectively. Here, a value of the filling factor in each example is calculated by using the maximum filling factor in the conventional dielectric drying method of the honeycomb formed body as a base (100%). Specifically, 100% filling factor means a state where carriers on which the honeycomb formed body is placed are continuously supplied without a space therebetween, i.e., a state where a space between adjacent carriers is 0 mm. In addition, 50% filling factor means a state where a space for one carrier (200 mm) is kept between the adjacent carriers, and 40% filling factor and 60% filling factor mean states where spaces of 300 mm and 133 mm are kept between the adjacent carriers, respectively. When the filling factor in the dry space in this experiment is converted into the number of honeycomb formed bodies, 50 pieces of honeycomb formed bodies (10 sheets of carriers) are supplied in Example 4 in which the filling factor is 40%, 60 pieces (12 sheets of carriers) in Example 5 in which the filling factor is 50%, and 75 pieces (15 sheets of carriers) in Example 6 in which the filling factor is 60%.

[Evaluation] As for the honeycomb formed body having dried under each condition, diameters at 20 different height positions were measured, respectively using the outer diameter shape automatic measurement apparatus disclosed in Patent Document, JP-B-63-34405. Here, the "height" of the honeycomb formed body means a distance to a predetermined position in an axial direction of the honeycomb formed body when an opening bottom end surface is defined as a starting point. At the time of measurement, diameters of 3000 points were measured, respectively by the optical gauge, with an area centroid of a cross section of the honeycomb formed body at each height position being a center, and an average value of the diameters was defined as an average diameter at each height position. Further, a difference between an average diameter in an opening top end surface and an average diameter in the opening bottom end surface is calculated as a diameter difference between the top and the bottom of the honeycomb formed body, and the calculated difference is shown in Table 4 with an average diameter of each end surface.

[Results] As is apparent from Table 4, in the drying methods of Examples 5 to 7 in which the power density is set within the range of 5 to 20 [kW/kg (water) ] by controlling the filling factor in the dry space to be lower than that in the conventional method, the top and bottom diameter difference is less than 0.5 mm, a size difference between the top and the bottom of the honeycomb formed body is improved, and thus dimensional accuracy is improved as the whole honeycomb formed body. It is preferable that a range of the top and bottom diameter difference is less than 0.5 mm since the difference causes failure such as cracks in the fired honeycomb structure in manufacturing the honeycomb structures. In addition, a value of the top and bottom diameter difference of the honeycomb formed body becomes smaller as the power density increases in inverse proportion to the filling factor, and thus it turned out that a size of the power density largely affects the shape of the dried honeycomb formed body. According to this experiment, it turned out that the power density is maintained in a desired range by controlling the filling factor in the dry space, thereby the top and bottom diameter difference of the dried honeycomb formed body falls within an allowable range, and that thus it becomes possible to manufacture a honeycomb structure with high dimensional accuracy.

TABLE 4

|  | Example 5 | Example 6 | Example 7 |
|---|---|---|---|
| Filling factor in dry space | 60 [%] | 50 [%] | 40 [%] |
| Power density | 12.3 [kW/kg (water)] | 14.2 [kW/kg (water)] | 18.3 [kW/kg (water)] |
| Supply speed | 525 [kg/h] | 650 [kg/h] | 650 [kg/h] |
| Average diameter of opening top end surface | 113.07 [mm] | 113.06 [mm] | 112.96 [mm] |
| Average diameter of opening bottom end surface | 113.50 [mm] | 113.41 [mm] | 113.24 [mm] |
| Top and bottom diameter difference | 0.43 [mm] | 0.35 [mm] | 0.28 [mm] |

INDUSTRIAL APPLICABILITY

A method of drying a honeycomb formed body of the present invention can suitably be utilized as drying means in steps of manufacturing with a good yield a high-quality honeycomb structure widely used for various filters etc. including catalyst carriers and DPFs.

EXPLANATIONS OF REFERENCE NUMERALS

1,101: Honeycomb formed body,
2: Partition wall,
3: Cell,
4: Outer wall,
5: Opening top end surface,
6: Opening bottom end surface,
10: Dielectric drying apparatus,
11: Conveyor,
12: Punching plate (Perforated plate),
35, 36: Electrode plate.

What is claimed is:

1. A method of drying a plurality of unfired honeycomb formed bodies each comprising a raw material composition containing a ceramic material, a dispersion medium, an auxiliary forming agent, and an addition agent, and each having a plurality of cells partitioned by partition walls, the cells serving as fluid through channels, the method comprising the steps of
   causing a current to flow, in a dry space, between opposing electrode plates that are provided at an upper side of an opening top end surface and at a lower side of an opening bottom end surface of each honeycomb formed body, to perform dielectric drying while maintaining throughout the entire duration of dielectric drying a power density with respect to each honeycomb formed body to be in a range of 5 to 20 [kW/kg (water)], and
   performing at least one of microwave drying and hot-air drying after performing the dielectric drying,
   wherein current is caused to flow between the opposing electrode plates until a predetermined level of water content factor of each honeycomb body is reached,
   wherein a water content factor of each honeycomb formed body before dielectric drying is 20 to 25% by mass,
   wherein the dielectric drying is performed until a water content factor of each honeycomb formed body after the dielectric drying becomes 10 to 40% with respect to the water content factor before the dielectric drying, and
   wherein the method maintains the power density in the dry space to be in the range of 5 to 20 [kW/kg (water)] by reducing a filling factor of the honeycomb formed bodies in the dry space to no more than 60%.

2. The method of drying the plurality of honeycomb formed bodies according to claim 1, wherein the method maintains the power density in the dry space to be in the range of 5 to 20 [kW/kg (water)] by suppressing an area of the opposing electrode plates to be a minimum size effective for drying.

3. The method of drying the plurality of honeycomb formed bodies according to claim 1, wherein a binder having thermal gelation property and/or thermosetting property is included in the raw material composition as the auxiliary forming agent.

4. The method of drying the plurality of honeycomb formed bodies according to claim 3, wherein a content of the binder in the raw material composition is 1 to 10% by mass by mass.

5. The method of drying the plurality of honeycomb formed bodies according to claim 1, wherein the method performs the dielectric drying while maintaining a wet-bulb temperature in the dry space to be not less than 60° C. and less than 100° C.

6. The method of drying the plurality of honeycomb formed bodies according to claim 1, wherein opening ratios of the plurality of cells of each honeycomb formed body are 70 to 90%, and thicknesses of the partition walls are 0.05 to 0.2 mm.

7. The method of drying the plurality of honeycomb formed bodies according to claim 1, further comprising the step of arranging the honeycomb formed bodies on carriers, and spacing the carriers from one another to achieve a filling factor of no more than 60%.

* * * * *